Feb. 22, 1938.　　　　C. H. LANK　　　2,109,355
LIQUID LEVEL GAUGE
Original Filed Aug. 29, 1933
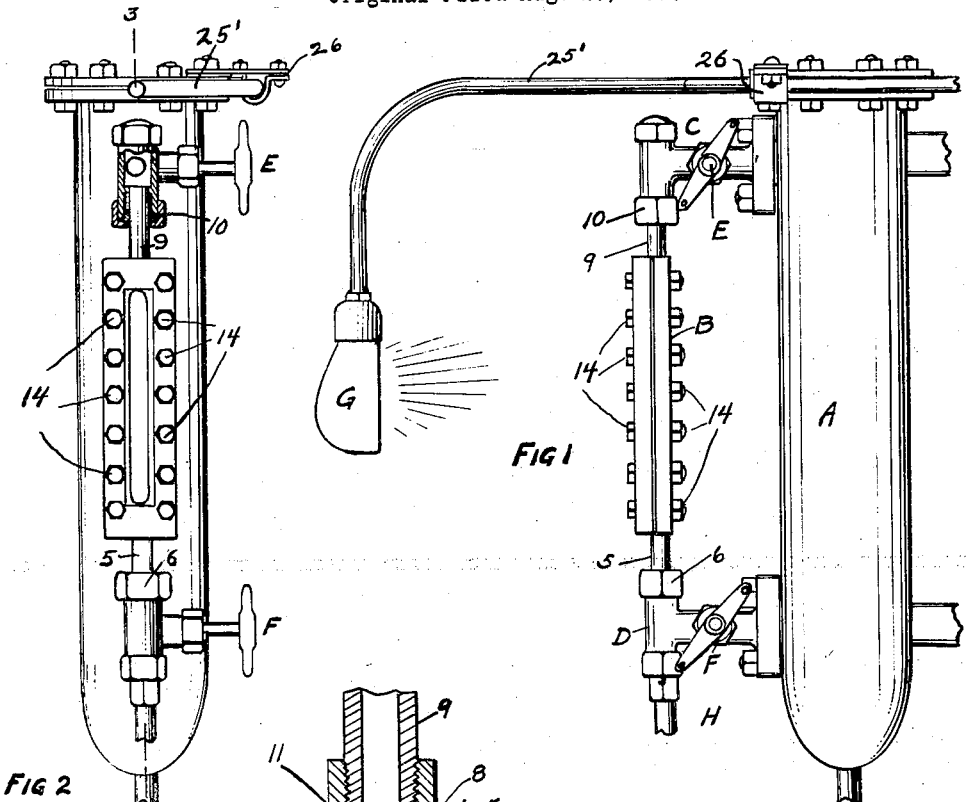
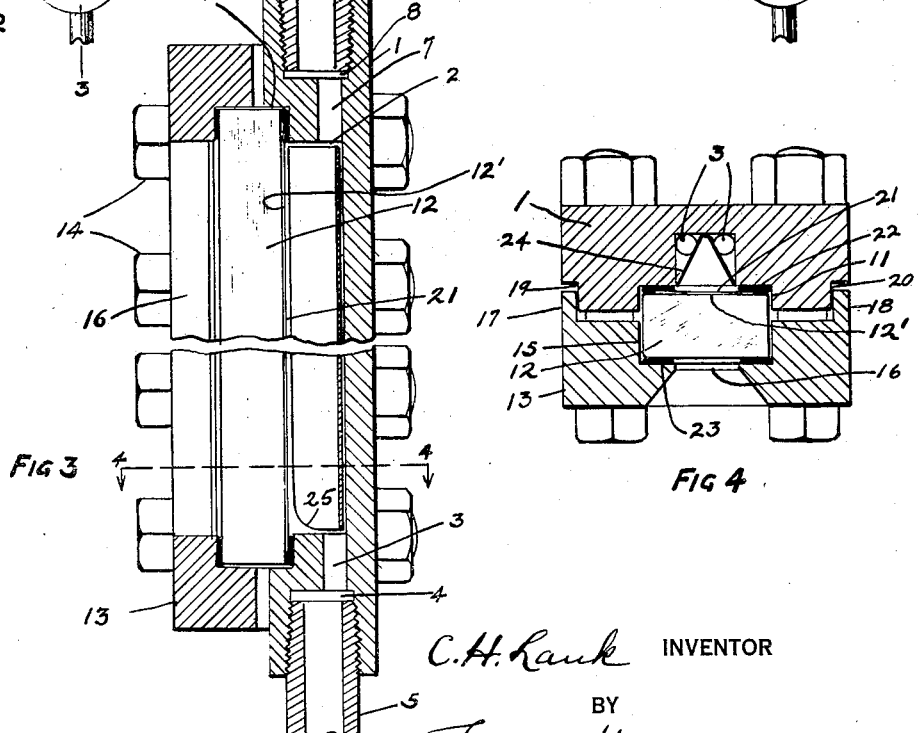
C. H. Lank  INVENTOR
BY Thomas Howe ATTORNEY Patented Feb. 22, 1938

2,109,355

UNITED STATES PATENT OFFICE 2,109,355

LIQUID LEVEL GAUGE

Clarence H. Lank, Gloucester, Mass.

Application August 29, 1933, Serial No. 687,280
Renewed July 8, 1937

1 Claim. (Cl. 73—327)

This invention relates to gauges for indicating liquid levels, especially to the indication of the water level in steam boilers.

The main object of the invention is to provide a rugged, durable and simple gauge and which shall be efficient in operation, especially in connection with high steam pressures, and the high temperatures incident thereto.

As is well known the usual water gauge on steam boilers comprises a circular glass tube suitably held, and communicating with the boiler, by fittings at its ends. With the high pressure and temperature due to high pressure steam, above say 400 lbs. or 500 lbs. pressure, the surface of the glass exposed to the steam is liable to deterioration known as "frosting" which impairs the visibility of the water level through the glass. In the type of gauge as referred to it is practically impossible to protect the steam surface of the glass from deterioration as noted. This may, however, be done by employing a flat glass in a suitable holder and covering its steam exposed surface by a protective covering such as a layer of clear and transparent mica. It is necessary that the glass surface against which this protecting covering lies should be a plane, flat surface. A fluted or otherwise recessed surface is not suitable to support the protective facing.

According to the present invention a metal holder having a longitudinal recess is provided, the open side of the recess being closed by a glass plate presenting a plane surface to the recess, the recess being connected by suitable fittings with the boiler or other liquid receptacle in which the liquid level is to be gauged, said liquid level being viewable through the glass plate. The inner plane surface of the glass plate is adapted to receive the protecting covering which may be of mica as stated.

A further object of the invention is to provide a suitable reflector within the recess referred to which shall improve the visibility of the gauge.

A further object of the invention is to provide illuminating means which in combination with the reflector shall give a high degree of visibility of the gauge.

Other and ancillary objects of the invention will appear hereinafter.

In the accompanying drawing which illustrates the invention—

Fig. 1 is a side elevation of the improved gauge attached to the usual water column of a boiler and with an illuminating lamp;

Fig. 2 is a front elevation of the apparatus of Fig. 1 with the lamp omitted for the sake of clearness and partly broken away to show a section;

Fig. 3 is a section, on an enlarged scale, on the line 3—3 of Fig. 2, portions of the apparatus being broken away;

Fig. 4 is a section on the line 4—4 of Fig. 3.

Referring to the drawing, the apparatus comprises the usual water column A in connection with a steam boiler and having a water gauge B connected with the water column by upper and lower fittings C and D respectively, the communication with the water gauge through these fittings being controlled respectively by valves E and F. Also a lamp G is provided for illuminating the gauge. The usual "blow down" pipe H is also provided.

The gauge comprises a metal, preferably steel, block 1 having the elongated recess 2. The bottom portion of the recess communicates by two holes 3 with the bore 4 into which is screwed the pipe 5 which passes into a stuffing box 6 in the lower fitting. It will be noted that the passages 3 are located at the rear corners of the recess 2. The top of the recess 2 communicates by a similar pair of passages 7 with a bore 8 within which is secured the pipe 9 which enters within a stuffing box 10 in the upper fitting C. About the outer edge of the recess 2 a rabbet 11 is formed in the block 1, into which enters a transparent flat glass bar or plate 12 having the plane inner face 12' which is secured in position by the metal preferably steel, cap plate or block 13 which is drawn against the glass plate by means of bolts 14 passing through the cap plate and the block 1. The cap plate 13 is provided with an elongated recess 15 which receives the glass plate 12 and the bottom or front of the recess is provided with a slot 16 through which and the glass plate sight may be had into the recess 2 of the block 1. The cap plate 13 is also provided with guiding flanges 17 and 18 at its sides which enter the rabbets 19 and 20 in the block 1 and serve to properly relatively position the block and cap plate. The recess for the glass plate formed by the recess 15, and rabbet groove 11 does not fit the glass plate tightly but provides a clearance thereabout so that there may be relative expansion and contraction of the metal and glass under changes in temperature. The inner face of the glass plate is covered by a mica sheet 21 which protects the glass from erosion or other injury by the steam or water which would otherwise come in contact with it and between the mica sheet and the block 1, and entirely surrounding the recess 2 is a suitable gasket 22 of resilient material which makes a water tight joint when the glass is forced against the block 1 by means of the cap plate 13 and the bolts 14. Also a similar gasket 23 is interposed between the front of the glass plate and the cap plate 13 and entirely surrounds the slot 16. These resilient gaskets 22 and 23 provide a cushion bearing between the glass and the metal parts which aids in preventing cracking of the glass due to possible distortion of the metal by changes in temperature.

To aid in the visibility a bent strip of metal 24 is placed in the recess 2, the forward concave face of the metal strip is polished, burnished or otherwise treated to form a light reflecting surface.

It will be observed that the passages 3 and 7 leading to the fittings open into the recess 2 behind the metal strip 24 so that the strip acts as a guard to prevent any high velocity steam or water from impinging upon or passing in contact with the mica plate (or the glass if the mica plate should be omitted) to such extent as to damage the same, for instance during a "blow down" operation. Also the location of the openings 7 and 3 tend to cause any condensate to drain down the back of the recess instead of over the mica or glass which would be liable to be injured thereby. The metal reflecting and guard strip 24, fits within its recess with sufficient closeness to prevent its material displacement and its lower corners 25 are curved to provide openings through which the water which it is desired to observe may pass to the front of this strip.

It will thus be seen that a rugged and simple structure of gauge is provided wherein the glass plate is effectively protected from injurious action of the water or steam. The "blow down" of the gauge may be effected by manipulating the valves E and F, and the usual valve in the pipe H, in the usual way. During the "blow down" the steam or water will pass back of the metal reflector strip 24 and so be prevented from injuriously coming in contact with the mica strip or with the glass if the mica strip should be omitted, and condensate is prevented from passing over the glass or mica and injuring the same.

The lamp G for illuminating the gauge is supported in front of the gauge by means of an arm 25' secured in the clamp 26 mounted upon the water column, and the lamp may be adjusted toward and away from the gauge by sliding the arm 25' through the clamp.

While the invention has been described in what is considered its best application it may have other embodiments without departing from its spirit and is not therefore limited to the structures shown in the drawing.

What I claim is:

In a liquid level gauge, the combination with a metal member having an elongated recess, a glass plate closing the open side of said recess and a reflector, concave on the side toward said glass, removably mounted in said recess, said recess having openings for communication with the receptacle, the level in which is to be observed, said openings being separated at the rear of and at each side of said reflector.

CLARENCE H. LANK.